United States Patent
Parker

(10) Patent No.: US 6,762,920 B2
(45) Date of Patent: Jul. 13, 2004

(54) ELECTRONIC FAULT DETECTOR FOR VARIABLE FREQUENCY AC SYSTEMS AND CIRCUIT BREAKER INCORPORATING SAME

(75) Inventor: Kevin Lynn Parker, Pittsburgh, PA (US)

(73) Assignee: Eaton Corporation, Cleveland, OH (US)

(*) Notice: Subject to any disclaimer, the term of this patent is extended or adjusted under 35 U.S.C. 154(b) by 177 days.

(21) Appl. No.: 10/135,591

(22) Filed: Apr. 30, 2002

(65) Prior Publication Data

US 2003/0202303 A1 Oct. 30, 2003

(51) Int. Cl.[7] .................................. H02H 3/08

(52) U.S. Cl. .................................. 361/93.1

(58) Field of Search .................. 361/93.1, 111, 361/115, 88, 78, 42

(56) References Cited

U.S. PATENT DOCUMENTS

| 5,682,101 A | 10/1997 | Brooks et al. |
| 5,691,869 A | 11/1997 | Engel et al. |
| 5,933,305 A | 8/1999 | Schmalz et al. |
| 5,945,802 A | 8/1999 | Konrad et al. |
| 6,522,509 B1 * | 2/2003 | Engel et al. .......... 361/42 |

* cited by examiner

Primary Examiner—Brian Sircus
Assistant Examiner—James A. Demakis
(74) Attorney, Agent, or Firm—Marvin L. Anion; Martin J. Moran

(57) ABSTRACT

A fault detector processes half cycles of current in variable frequency ac power systems by weighting half cycle magnitude values by the period of the half cycle. Time attenuated accumulations of the weighted half cycle peak values exceeding a first threshold for short delay protection, and of weighted positive differences between the peak values of successive half cycles and the preceding half cycles for a selected period of time after a peak value exceeds a second threshold for arc faults, generate trip signals when they reach specified levels.

1 Claim, 3 Drawing Sheets

ELECTRONIC FAULT DETECTOR FOR VARIABLE FREQUENCY AC SYSTEMS AND CIRCUIT BREAKER INCORPORATING SAME

CROSS REFERENCE TO RELATED APPLICATION

Commonly owned U.S. patent application Ser. No. 09/621,253, filed on Jul. 21, 2000 and entitled *Arc Fault Detection In AC Electric Power Systems*.

BACKGROUND OF THE INVENTION

1. Field of the Invention

This invention relates to an electronic detector for detecting faults, and particularly arc faults and persistent overload current faults, in a variable frequency ac power system.

2. Background Information

Ac power generation and distribution systems for aerospace, industrial and residential applications have historically been designed and optimized to operate with voltage sources of a fixed amplitude and frequency. Examples of this include the 60 Hz system used for power generation and distribution in the United States, a similar 50 Hz system in Europe, and the 400 Hz power distribution systems which are standard on most aircraft.

However, there is interest in developing variable frequency power generation and distribution systems for aircraft. This new approach would dispense with the variable-to-fixed frequency transmissions which are presently used to generate 400 Hz ac power on aircraft, with the intent of reducing costs, weight and volume. In exchange, all electrical loads on board the aircraft would be designed to operate over a range of ac source voltage frequencies; for example, from about 200 Hz to about 800 Hz.

A known technique for arc fault protection in 60 Hz ac power systems detects the random step changes in ac current caused by the striking of an arc. When a time attenuated accumulation of the step changes reaches a selected value, an arc signal is generated. This technique is not adaptable to the 400 Hz aircraft systems. First, the 400 Hz waveforms are much steeper than the 60 Hz waveforms making it more difficult to distinguish the normal current rise from the step increase caused by an arc. Secondly, and more importantly, aircraft electrical systems utilize small gauge wires which can be very long and therefore have substantial resistance. As a result, a load close to the generator can draw a normal current that far exceeds a fault current on the remote part of the wiring. Thus, a fault current may draw a couple of thousand amps if close to the generator but only perhaps 30 or 40 amps if in a remote section of the wiring. It is not practical, therefore, to rely on the magnitude of current in an aircraft electrical system to distinguish an arc fault. U.S. patent application Ser. No. 09/621,253 describes an arc fault detector suitable for aircraft ac electrical systems or other ac systems operating at higher frequencies such as 400 Hz that generates a cumulative sum of amounts by which the ac current in each most recent cyclic interval exceeds the current in the immediately preceding half cycle in absolute magnitude. An arc fault indication is generated when a time attenuated value of this cumulative sum reaches a selected level.

Up until now, fault algorithms for electronic fault detectors have been designed for use with ac power systems in which the operating frequency has been essentially fixed. There is a need, therefore, for an improved electronic fault detector, and a circuit breaker incorporating such an electronic fault detector, designed to operate with variable frequency ac systems.

SUMMARY OF THE INVENTION

This need and others are satisfied by the invention which is directed to an electronic fault detector for detecting faults in a variable frequency ac electrical system that comprises a current detector detecting the variable frequency ac current flowing in the variable frequency ac electrical power system, and processing means for processing half cycles of the variable frequency current for indications of a fault. In accordance with one aspect of the invention, the processing means processes the half cycles of ac current for indications of arc faults. In accordance with another aspect of the invention, the half cycles of ac current are processed for indications of persistent overload currents thereby providing a short delay protection function for the variable frequency ac system.

More particularly, the processing means of the detector includes measuring means measuring the magnitude and corresponding period of selected half cycles of the variable ac current, and signal generating means that generates a fault signal as a function of the magnitude and corresponding period of the half-cycle. The measuring means also includes means detecting zero crossings of the variable frequency ac current for determination of the periods of the half cycles. The measuring means can determine the magnitude and period of successive half cycles of the variable frequency ac current.

For arc fault detection, the signal generating means includes accumulation means generating a time attenuated accumulation of the difference between the magnitude of successive half cycles of the variable frequency ac current and the magnitude of the immediately proceeding half-cycle weighted by the period of the most recent half-cycle. It further includes means generating the arc fault signal when the time attenuated accumulation reaches a predetermined arc fault value. The signal generating means can include a threshold means for only accumulating the differences between the magnitude of successive half cycles following a half-cycle in which the magnitude exceeds a selected threshold. The differences are accumulated only for a selected time period after the selected threshold is exceeded.

For the short delay protection, the signal generating means comprises accumulating means generating a time attenuated accumulation of the absolute magnitudes of successive half cycles scaled by the period of the half-cycle, and means generating a delayed overload current fault or short delay signal when the time attenuated accumulation reaches a predetermined short delay value.

The invention also embraces circuit breakers incorporating such fault detectors.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
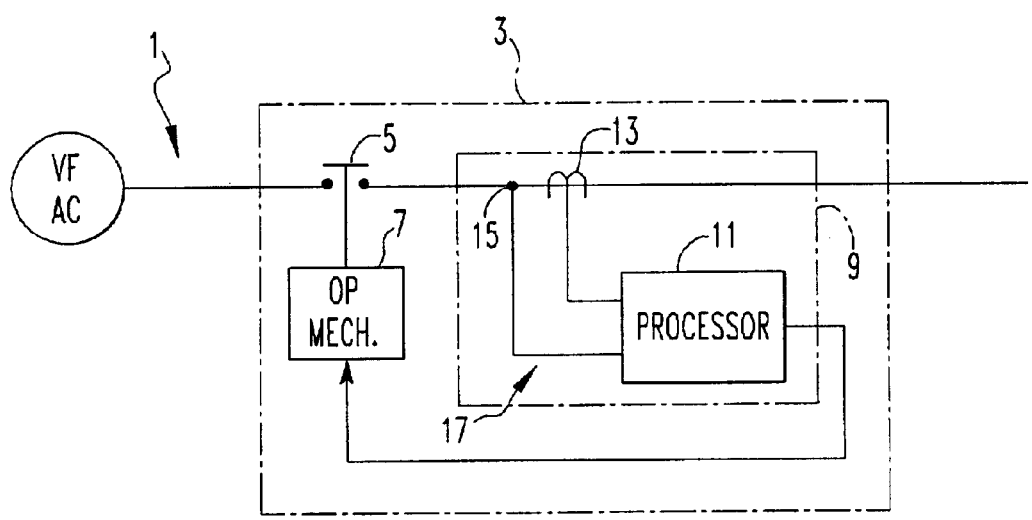
FIG. 1 is a schematic diagram of a variable frequency ac electrical system protected by a circuit breaker incorporating a fault detector in accordance with the invention.

Referring to FIG. 1, a variable frequency ac power system 1 is protected by a circuit breaker 3 in accordance with the invention. The circuit breaker 3 includes separable contacts 5 that are opened and closed by an operating mechanism 7. The circuit breaker 3 further includes an electronic fault detector 9 which includes a processor 11 having as inputs current in the variable ac system sensed by a current sensor 13 and voltage in the variable frequency ac system provided by the voltage tap 15. The current sensor 13 and voltage tap 15 form part of a measuring system 17.

Figure 2:
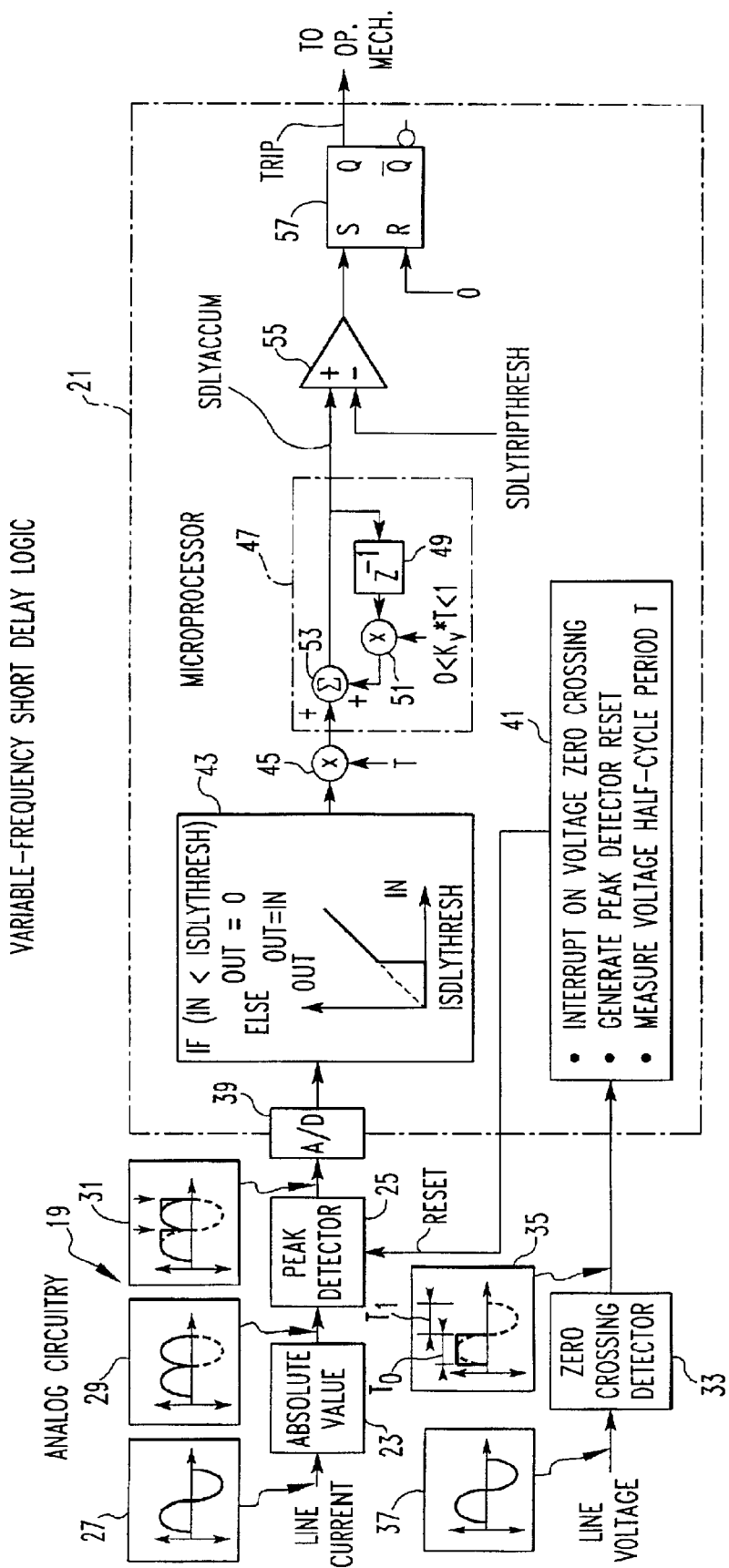
FIG. 2 is a functional diagram illustrating implementation of short delay protection by the circuit breaker illustrated in FIG. 1.

FIG. 2 illustrates the variable frequency short delay logic which may be implemented by the processing circuitry 11. It includes analog circuitry 19 and a microprocessor 21. The analog circuitry 19 includes an absolute value circuit 23 which full wave rectifies the line current signal provided by the current sensor 13, and a peak detector 25 that captures the magnitudes of the half cycles of the variable frequency ac current. Representations of the wave forms of the raw line current, rectified line current and a peak current value are shown at 27, 29 and 31, respectively. A zero crossing detector 33 generates a square wave 35 which changes state at the zero crossings of the variable ac system voltage waveform 37.

The microprocessor 21 includes an analog to digital (A/D) converter 39 which digitizes the output of the peak detector 25. The microprocessor 21 also includes algorithms implementing protection logic. This includes at 41 logic driven by the output of the zero crossing detector 33 which generates an interrupt on each zero crossing, a reset signal for the peak detector 25 and also measures the period T of each voltage half-cycle. The reset signal resets the peak detector 25 so that the peak value or magnitude of each half-cycle of the variable frequency ac current is input to the microprocessor by the A/D converter 39. Logic 43 passes the peak value of the half cycles that exceed a short delay threshold for current, ISDLYTHRESH. Values of the magnitude of half cycles that exceed the threshold are scaled at a multiplier 45 by the period of the half-cycle. An accumulator 47 then generates a time attenuated accumulation of the peak value of the successive half cycles that exceed the threshold ISDLYTHRESH. The attenuation is provided by subtracting from the current scaled value the previous value multiplied by the calculated period times a constant $K_v$, wherein the constant $K_v$ is selected such that when multiplied by the maximum value of the period T, the result is less than one. The accumulated value is compared in a comparator 55 with a short delay trip threshold SDLYTRIPTHRESH. When the accumulated value exceeds the trip threshold, the Q output of a trip latch 57 is set high to provide a trip signal to the operating mechanism 7.

Figure 3:
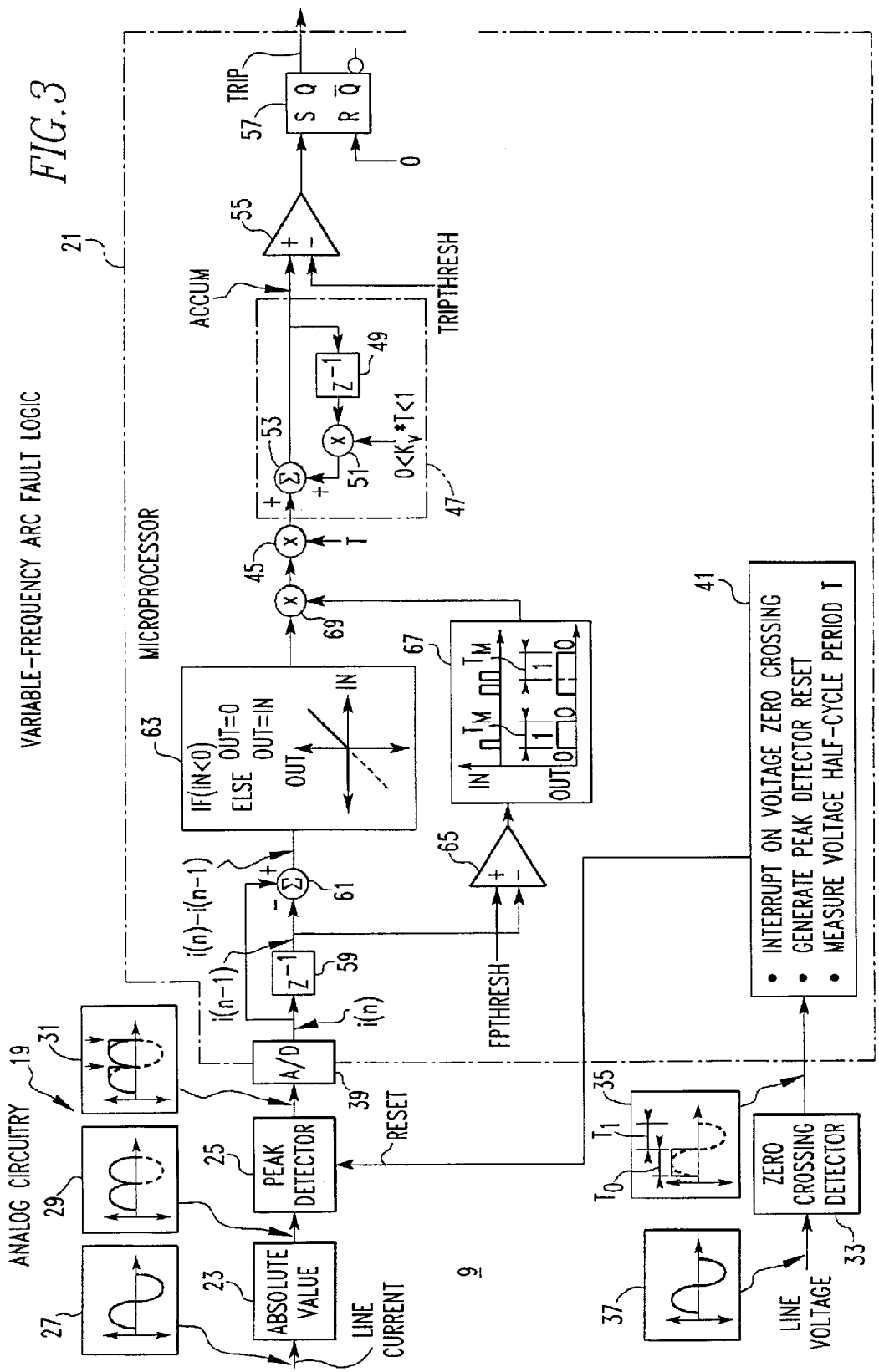
FIG. 3 is a functional diagram of arc fault protection implemented by the circuit breaker of FIG. 1.

FIG. 3 illustrates the variable frequency arc fault logic implemented by the processing circuitry 9. The analog circuitry 19 provides the same peak value of the variable frequency ac current and the zero crossing waveform of the voltage as in the short delay logic of FIG. 2 for digitizing by the A/D converter 39. The difference between the peak value of successive half cycles and the peak value of the corresponding preceding half-cycle stored at 59 is determined at 61. Only values of this difference which are positive, that is where the peak value of a half-cycle exceeds that of the previous half-cycle, are further processed by weighting the difference by the period of the most recent half-cycle at 45 and then generating a time attenuated accumulation of the result in the accumulator 47. However, in order for the differences to be time attenuated accumulated, a first pulse threshold FPTHRESH must be exceeded. This is determined by comparing the peak value of the last half-cycle to the first pulse threshold in a comparator 65. When the first pulse threshold is exceeded, timer logic is initiated at 67 which mimics a retriggerable monostable multivibrator. This logic function 67 normally has a zero output, but goes to a one and remains there for a selected interval each time that the first pulse threshold is exceeded. The positive differences output by 63 are multiplied by the logical one or zero output of the logic 67 at 69 so that only the difference signals generated by half cycles within the selected time period after the first pulse threshold is exceeded are applied to the accumulator 47. As in the case of the short delay logic, when the time attenuated accumulation in the accumulator 47 exceeds a trip threshold TRIPTHRESH as determined by the comparator 55, a trip latch 57 is set to provide a trip signal to the operating mechanism 7.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A fault detector for a variable frequency ac electric power system comprising:

current detector detecting variable frequency ac current flowing in the variable frequency ac electric power system;

processing means for processing half cycles of the variable frequency ac current for indications of a fault;

wherein the processing means comprises measuring means measuring the magnitude and corresponding period of selected half cycles of the variable frequency ac current and signal generating means generating a fault signal as a function of the magnitude and corresponding period of the selected half cycles of the variable ac current; and wherein the measuring means including means detecting zero crossings of the variable frequency ac current for determining the corresponding period.

* * * * *